United States Patent
Tang

(10) Patent No.: US 10,555,276 B2
(45) Date of Patent: Feb. 4, 2020

(54) METHOD AND DEVICE FOR RECEIVING INFORMATION, AND COMPUTER-READABLE MEDIUM

(71) Applicant: GUANGDONG OPPO MOBILE TELECOMMUNICATIONS CORP., LTD., Dongguan, Guangdong (CN)

(72) Inventor: Hai Tang, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 16/514,767

(22) Filed: Jul. 17, 2019

(65) Prior Publication Data
US 2019/0342858 A1    Nov. 7, 2019

Related U.S. Application Data

(63) Continuation of application No. PCT/CN2017/111390, filed on Nov. 16, 2017.

(51) Int. Cl.
*H04W 68/02* (2009.01)
*H04W 72/04* (2009.01)

(52) U.S. Cl.
CPC ......... *H04W 68/02* (2013.01); *H04W 72/042* (2013.01); *H04W 72/0453* (2013.01)

(58) Field of Classification Search
CPC ........................... H04W 68/02; H04W 72/042
See application file for complete search history.

(56) References Cited

U.S. PATENT DOCUMENTS

| | | | |
|---|---|---|---|
| 9,913,261 B2* | 3/2018 | Lee | H04W 72/042 |
| 10,080,218 B2* | 9/2018 | Yi | H04J 11/0069 |
| 2008/0311949 A1 | 12/2008 | Koskinen et al. | |
| 2015/0304995 A1* | 10/2015 | Yi | H04L 5/001 370/329 |

(Continued)

FOREIGN PATENT DOCUMENTS

| CN | 103580783 A | 2/2014 |
|---|---|---|
| CN | 104052532 A | 9/2014 |

OTHER PUBLICATIONS

International Search Report in international application No. PCT/CN2017/111390, dated May 30, 2018.

(Continued)

*Primary Examiner* — Ernest G Tacsik
(74) *Attorney, Agent, or Firm* — Ladas & Parry LLP

(57) ABSTRACT

The embodiments of the disclosure provide a method and a device for receiving information, and a computer-readable medium. The method may include: association relationships between paging bandwidths and synchronization or reference signals are acquired; a paging message is received in a paging bandwidth corresponding to the UE according to a synchronization or reference signal having an association relationship with the paging bandwidth corresponding to the UE in the association relationships. By the technical solutions in the embodiments of the disclosure, the UE can receive the paging message more accurately, and the success rate of receiving the paging message by the UE in the paging bandwidth corresponding to the UE is improved.

13 Claims, 4 Drawing Sheets

Association relationships between paging bandwidths and synchronization or reference signals are acquired — S110

A paging message is received in a paging bandwidth corresponding to the UE, according to a synchronization or reference signal having an association relationship with the paging bandwidth corresponding to the UE in the association relationships — S120

(56) References Cited

U.S. PATENT DOCUMENTS

| | | | | |
|---|---|---|---|---|
| 2015/0341877 A1* | 11/2015 | Yi | ........................ | H04W 56/00 |
| | | | | 370/350 |
| 2015/0365209 A1* | 12/2015 | Yi | ........................ | H04L 5/001 |
| | | | | 370/329 |
| 2016/0344524 A1* | 11/2016 | Kim | ..................... | H04B 7/0617 |
| 2017/0070312 A1* | 3/2017 | Yi | ....................... | H04J 11/0069 |
| 2017/0111098 A1* | 4/2017 | Kim | ..................... | H04B 7/0626 |
| 2017/0367069 A1* | 12/2017 | Agiwal | ............... | H04B 7/0695 |
| 2018/0098361 A1* | 4/2018 | Ji | ............................ | H04L 45/00 |
| 2018/0184410 A1* | 6/2018 | John Wilson | ......... | H04L 5/0048 |
| 2018/0242276 A1* | 8/2018 | Patel | .................... | H04W 68/02 |
| 2019/0103931 A1* | 4/2019 | Yi | ........................ | H04W 56/00 |
| 2019/0229789 A1* | 7/2019 | Zhang | ................ | H04B 7/0617 |
| 2019/0260530 A1* | 8/2019 | Yi | ........................... | H04L 5/001 |

OTHER PUBLICATIONS

Written Opinion of the International Search Authority in international application No. PCT/CN2017/111390, dated May 2018.
Ericsson 3GPP TSG-RAN WG2 #99bis Quasi-co-location information in SIBI and RRC Reconfiguration (Oct. 13, 2017).

* cited by examiner

METHOD AND DEVICE FOR RECEIVING INFORMATION, AND COMPUTER-READABLE MEDIUM

CROSS-REFERENCE TO RELATED APPLICATIONS

The application is a continuation application of PCT Application No. PCT/CN2017/111390 filed on Nov. 16, 2017, the disclosure of which is incorporated by reference herein in their entireties.

BACKGROUND

With the development of a communication technology, the research on a $5^{th}$ Generation (5G) has been conducted. The radio access of the 5G is referred to as New Radio (NR). Since a frequency band adopted in the 5G NR is higher than a frequency band adopted in a Long Term Evolution (LTE) system, the path loss of radio signal transmission is increased and the coverage of a radio signal becomes small. In a 5G system, a beam is formed via a multi-antenna system of a base station by using a beamforming technology, thereby improving the gain of the radio signal and compensating for the path loss.

In the 5G NR system, a common channel and a common signal cover the whole cell in a multi-beam scanning manner, so that User Equipment (UE) in the cell can receive the common channel and the common signal. Moreover, the 5G NR supports a wideband carrier, but due to limitation of UE capability, the UE can support a maximum bandwidth less than a bandwidth supported by a network system. Therefore, in the 5G NR system, the wideband carrier of the network system is further configured to a plurality of BandWidth-Parts (BWPs).

For a paging process of the UE, under an environment of the multi-beam scanning as well as the bandwidth of network system configured into a plurality of BWPs, how the UE can accurately receive a paging message is a problem that needs to be solved.

SUMMARY

In order to solve the above technical problem, the embodiments of the disclosure are intended to provide a method and a device for receiving information, and a computer readable medium.

The technical solutions of the embodiments of the disclosure may be implemented as follows.

In a first aspect, an embodiment of the disclosure provides a method for receiving information. The method is applied to a UE and may include the following operations.

Association relationships between paging bandwidths and synchronization or reference signals are acquired.

A paging message is received in a paging bandwidth corresponding to the UE, according to a synchronization or reference signal having an association relationship with the paging bandwidth corresponding to the UE in the association relationships.

In a second aspect, an embodiment of the disclosure provides a UE. The UE may include a processor and a network interface.

The processor is configured to acquire association relationships between paging bandwidths and synchronization or reference signals.

The processor is further configured to receive, through the network interface, a paging message in a paging bandwidth corresponding to the UE, according to a synchronization or reference signal having an association relationship with the paging bandwidth corresponding to the UE in the association relationships.

In a third aspect, an embodiment of the disclosure provides a network device. The network device may include a processor and a network interface.

The processor is configured to carry, in RMSI or OSI, indication information of a paging bandwidth corresponding to a UE and indication information of a synchronization or reference signal having an association relationship with the paging bandwidth.

The network interface is configured to send the RMSI or the OSI to the UE.

In a fourth aspect, an embodiment of the disclosure provides a method for receiving information. The method is applied to a UE and may include the following operations.

Association relationships between paging bandwidths and synchronization or reference signals are acquired.

A synchronization or reference signal associated with a paging bandwidth corresponding to the UE is acquired according to the association relationships.

A paging message is received in the paging bandwidth corresponding to the UE, according to the synchronization or reference signal.

In a fifth aspect, an embodiment of the disclosure provides a method for receiving information. The method is applied to a network device and may include the following operations.

Indication information of a paging bandwidth corresponding to a UE and indication information of a synchronization or reference signal having an association relationship with the paging bandwidth are carried in Remaining Minimum System Information (RMSI) or Other System Information (OSI).

The RMSI or the OSI is sent to the UE.

In a sixth aspect, an embodiment of the disclosure provides a UE. The UE may include a first acquisition portion, a second acquisition portion and a receiving portion.

The first acquisition portion is configured to acquire association relationships between paging bandwidths and synchronization or reference signals.

The second acquisition portion is configured to acquire, according to the association relationships, a synchronization or reference signal associated with a paging bandwidth corresponding to the UE.

The receiving portion is configured to receive, in the paging bandwidth corresponding to the UE according to the synchronization or reference signal, a paging message.

In a seventh aspect, an embodiment of the disclosure provides a network device. The network device may include a carrying portion and a sending portion.

The carrying portion is configured to carry, in RMSI or OSI, indication information of a paging bandwidth corresponding to a UE and indication information of a synchronization or reference signal having an association relationship with the paging bandwidth.

The sending portion is configured to send the RMSI or the OSI to the UE.

In an eighth aspect, an embodiment of the disclosure provides a UE. The UE may include a first network interface, a first memory and a first processor.

The first network interface is configured to receive and send signals in a process of receiving and sending information between the UE and other external network elements.

The first memory is configured to store a computer program executed on the first processor.

The first processor is configured to perform, when executing the computer program, the operations of the method in the first aspect or the fourth aspect.

In a ninth aspect, an embodiment of the disclosure provides a network device. The network device may include a second network interface, a second memory and a second processor.

The second network interface is configured to receive and send signals in a process of receiving and sending information the network device and other external network elements.

The second memory is configured to store a computer program capable of being executed on the second processor.

The second processor is configured to perform, when executing the computer program, the operations of the method in the fifth aspect.

In a tenth aspect, an embodiment of the disclosure provides a computer readable medium. The computer readable medium stores a program for receiving information that, when executed by at least one processor, to implement the operations of the method in the first aspect, the fourth aspect, or the fifth aspect.

DETAILED DESCRIPTION

In order to be able to understand the characteristics and technical contents of the embodiments of the disclosure in more detail, the implementation of the embodiments of the disclosure will be described in detail below in combination with accompanying drawings. The appended accompanying drawings are merely for reference, and are not intended to limit the embodiments of the disclosure.

Figure 1:
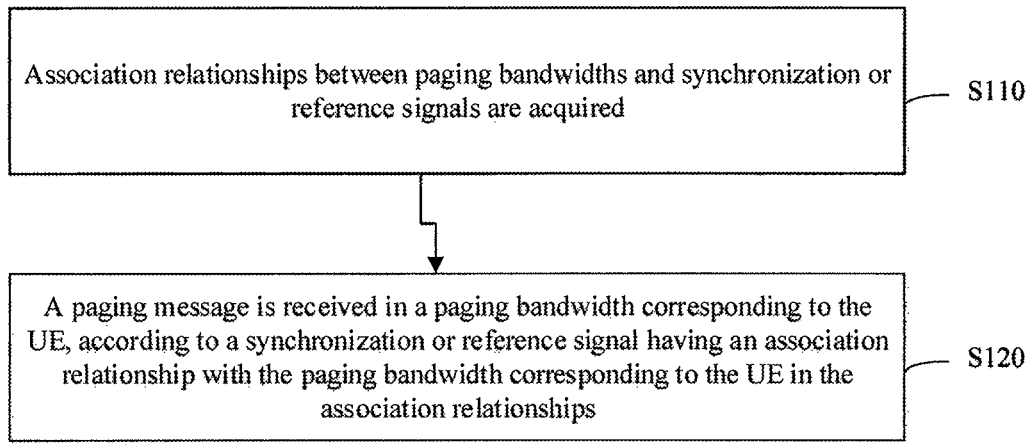
FIG. 1 is a flowchart of a method for receiving information according to an embodiment of the disclosure.

FIG. 1 illustrates a flowchart of a method for receiving information according to an embodiment of the disclosure. The method may be applied to a UE and may include the following operations.

At S110: association relationships between paging bandwidths and synchronization or reference signals are acquired.

At S120: a paging message is received in a paging bandwidth corresponding to the UE, according to a synchronization or reference signal having an association relationship with the paging bandwidth corresponding to the UE in the association relationships.

Figure 2:
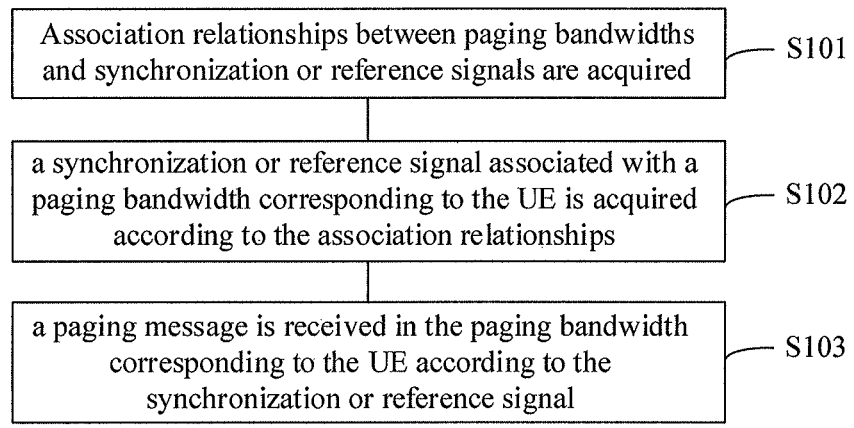
FIG. 2 is a flowchart of a method for receiving information according to another embodiment of the disclosure.

FIG. 2 illustrates a flowchart of a method for receiving information according to another embodiment of the disclosure. The method may be applied to a UE and may include the following operations.

At S101: association relationships between paging bandwidths and synchronization or reference signals are acquired.

At S102: a synchronization or reference signal associated with a paging bandwidth corresponding to the UE is acquired according to the association relationships.

At S103: a paging message is received in the paging bandwidth corresponding to the UE, according to the synchronization or reference signal.

With the technical solutions illustrated in FIG. 1 or FIG. 2, after the UE determines a paging bandwidth corresponding to the UE, a synchronization or reference signal associated with the paging bandwidth corresponding to the UE can be obtained based on the acquired association relationships between the paging bandwidths and the synchronization or reference signals. Thus, the UE can obtain a synchronization and channel state according to the synchronization or reference signal, and receive a paging message from the paging bandwidth corresponding to the UE. In such a manner, the UE can receive the paging message more accurately, and the success rate of receiving the paging message by the UE in the paging bandwidth corresponding to the UE is improved.

In the embodiment of the disclosure, each association relationship can be used for indicating that the UE receives a paging message from a paging bandwidth. Specifically, each association relationship preferably may be a Quasi-Co-Location (QCL) relationship.

Moreover, in the embodiment of the disclosure, the synchronization or reference signal may include at least one of: a Synchronization Signal block (SS block), a Channel State Information Reference Signal (CSI-RS), or a Tracking Reference Signal (TRS). Specifically, the synchronization or reference signal may be configured by a network device to the UE. Furthermore, the SS block and the CSI-RS are used for Radio Resource Management (RRM) and mobility measurement, and the TRS is used for time frequency tracking.

Figure 3:
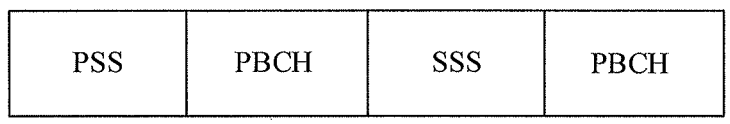
FIG. 3 is a structural diagram of a Synchronization Signal (SS) block according to an embodiment of the disclosure.

Specifically, in a 5G NR system, an SS and a broadcast channel need to cover the whole cell in a multi-beam scanning manner so that a UE in the cell receives the SS and the broadcast channel. The multi-beam transmission of the SS is implemented by defining an SS burst set. An SS burst set includes one or more SS bursts, and an SS burst includes one or more SS blocks. An SS block is used for bearing an SS and a broadcast channel of a beam. As a result, an SS burst set may include synchronization signals of beams, of which the number is the same as the SS block number, in a cell. An SS block includes a Primary Synchronization Signal (PSS) occupying one symbol, a Secondary Synchronization Signal (SSS) occupying one symbol and New Radio Access Technology-Physical broadcast channels (NR-PBCHs) occupying two symbols. Specifically, the structural diagram of the SS block is illustrated in FIG. 3. In addition to the SS and the PBCH on which the multi-beam scanning needs to be performed, other some common information such as Remaining Minimum System Information (RMSI) and a paging message also needs to be sent in the multi-beam scanning manner.

For the technical solutions in FIG. 1 or FIG. 2, for the operation of acquiring the association relationships in S110 or S101, two exemplary implementation manners are provided in the embodiment as follows.

In a first possible implementation manner, the operation that association relationships between paging bandwidths and synchronization or reference signals are acquired may include the following operations.

RMSI or Other System Information (OSI) is received, where the RMSI or the OSI is used for notifying indication information of each of the paging bandwidths and indication information of a synchronization or reference signal having an association relationship with the paging bandwidth.

It may be understood that the UE determines a paging bandwidth according to an indication of indication information of the paging bandwidth, and acquires the synchronization or reference signal having the association relationship with the paging bandwidth according to the indication information of the synchronization or reference signal having the association relationship with the paging bandwidth. In the first possible implementation manner, for the RMSI, in the 5G NR system, a common search space needs to be defined for an initially accessed UE and is used for receiving common control information such as the RMSI. Therefore, a concept of a Control Resource Set (CORESET) is introduced to define a resource set for carrying control information. The UE detects, in the resource set, a New Radio Access Technology-Physical Downlink Control channel (NR-PDCCH) to obtain scheduling information of a New Radio Access Technology-Physical Downlink Shared channel (NR-PDSCH) carrying the RMSI. Indication information of the CORESET is carried in the NR-PBCH and is used by the UE to receive the RMSI. By the same reasoning, since the UE needs to receive the paging message, the UE also needs to determine CORESET information for receiving paging indication information, i.e., CORESET for paging. The CORESET information is indicated to the UE via the RMSI, so that the UE detects paging indication information according to the CORESET information to receive the paging message.

In a second possible implementation manner, the operation that association relationships between paging bandwidths and synchronization or reference signals are acquired may include the following operations.

Each association relationship is defined according to a preset association relationship establishment strategy.

The preset association relationship establishment strategy comprises one of:

a paging message in a paging bandwidth has an association relationship with a synchronization or reference signal on a BWP on which the paging bandwidth is located, where the paging bandwidth is a part of the BWP and the BWP is a part of a system bandwidth, a paging message in a paging bandwidth has an association relationship with a synchronization or reference signal that is closest to the paging bandwidth in a frequency domain, or a paging message in a paging bandwidth has an association relationship with a preset synchronization or reference signal.

For the second possible implementation manner, in the 5G NR, the system bandwidth supports a wideband carrier and the system carrier bandwidth may be up to 400 MHz. The network device has a high processing capacity and thus can support the wideband carrier. However, the UE is restricted by a cost, a power and the like and thus the wideband supported by the UE is restricted by the capability of the UE. As a result, one or more BWPs are configured for a wideband carrier, and each BWP includes a group of continuous Physical Resource Blocks (PRBs). For a UE, in a serving cell, it is allowed that at most one active DL BWP and at most one active UL BWP coexist. Moreover, before a BWP is configured for the UE, there is an initial active Downlink/Uplink (DL/UL) BWP. The active DL/UL BWP is within a minimum bandwidth range of the UE so as to be received by all capable UEs. During a RRC connection establishment process or after the RRC connection establishment, a special active DL/UL BWP may be configured for the UE.

Figure 4:
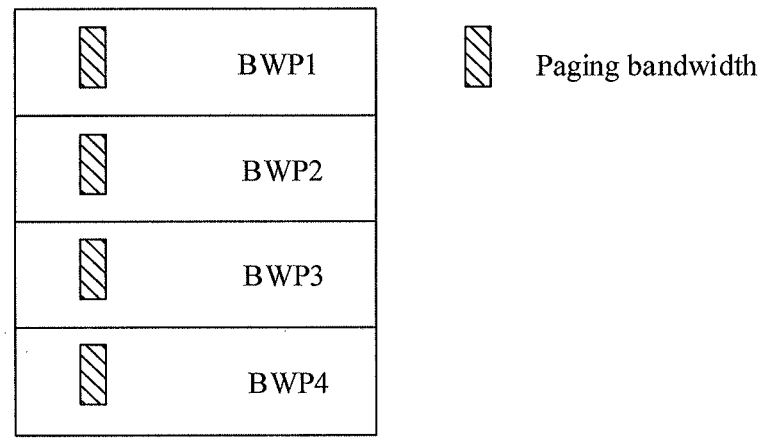
FIG. 4 is a diagram of system bandwidth division according to an embodiment of the disclosure.

For a UE in an idle state, due to the existence of the initial active DL/UL BWP, the most direct manner is to carry the paging message on the initial active DL/UL BWP to send. Since the bandwidth of the initial active DL/UL BWP meets the minimum bandwidth capacity of the UE, all capable UEs may receive the paging on the initial active DL/UL BWP. However, generally, the minimum bandwidth capacity of the UE is 10 MHz, which results in that the bandwidth of the initial active DL/UL BWP is limited. In addition to carrying the SS block, when the paging message, the data and the like are to be carried simultaneously, the congestion of paging and data transmission on the BWP is caused and thus the paging delay is increased. In order to avoid such a situation, the paging messages of the UE in the cell may be dispersed to a plurality of different BWPs, so that the paging messages are loaded on different BWPs for averaging. As illustrated in FIG. 4, a paging bandwidth for carrying the paging message is provided on each of a plurality of BWPs of the system bandwidth, and different UEs each may acquire a paging bandwidth for carrying a paging message corresponding to the UE.

In the embodiment of the disclosure, the paging bandwidth may be a frequency domain bandwidth or a frequency domain position, which is indicated by the CORESET; or may also be a frequency domain bandwidth carrying at least one of paging indication information or a paging message. In other words, the paging bandwidth may be a frequency domain location at which the paging indication information and the paging message are carried, or a frequency domain location corresponding to the CORESET for transmission of the paging indication information, or a frequency domain location at which the paging message is sent.

It may be understood that the paging indication information specifically may be carried in Downlink Control Information (DCI) sent by a Physical Downlink Control Channel (PDCCH) that is scrambled with a Paging-Radio Network Tempory Identity (P-RNTI), and the UE receives, according to the paging indication information, the paging message carried in a Physical Downlink Shared Channel (PDSCH).

In the system bandwidth, there may be a plurality of SS blocks, e.g., a SS block exists in each of different BWPs, and the UE in the idle state may detect one or more SS blocks in the system bandwidth. When the UE determines that a paging bandwidth corresponding to the UE has no association relationship (such as QCL relationship) with the detected SS block(s), or that an SS detected by the UE cannot be used for synchronization reference when the UE receives the paging bandwidth, it is essential for the UE to acquire an SS or a reference signal that has an association relationship (such as QCL relationship) with the paging bandwidth corresponding to the UE. Therefore, the method illustrated in FIG. 1 or FIG. 2 may further include the following operation: responsive to that it is detected that the system bandwidth includes more than one synchronization or reference signal and the received paging bandwidth corresponding to the UE has no the QCL association relationship with the detected synchronization or reference signal, a synchronization or reference signal having the QCL association relationship with the paging bandwidth correspondingly received by the UE is acquired. Specifically, the situation in which the paging bandwidth corresponding to the UE has no association relationship with the detected synchronization or reference signal may include one of:

a BWP on which the paging bandwidth corresponding to the UE is located different from a BWP on which the detected synchronization or reference signal is located, or a distance between a frequency domain location of the paging bandwidth corresponding to the UE and a frequency domain location of the detected synchronization or reference signal is greater than a set distance threshold, so that the frequency domain spacing distance is larger, or a frequency domain location of the paging bandwidth corresponding to the UE and a frequency domain location of the detected synchronization or reference signal belong to different Radio-Frequency (RF) chains.

When the paging bandwidth corresponding to the UE has no QCL relationship with the detected synchronization or reference signal, the UE needs to obtain an appropriate synchronization or reference signal according to the technical solutions illustrated in FIG. 1 or FIG. 2 for synchronization, and thus the paging message sent on the paging bandwidth is further received.

Figure 5:
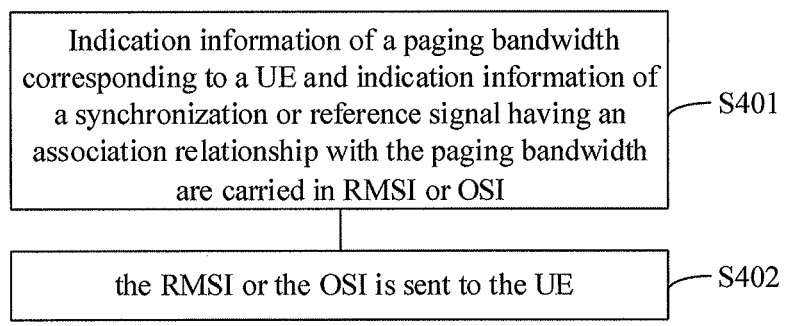
FIG. 5 is a flowchart of another method for receiving information according to an embodiment of the disclosure.

Based on the same inventive concept as the foregoing embodiments, FIG. 5 illustrates a flowchart of a method for receiving information according to an embodiment of the disclosure. The method is applied to a network device and may include the following operations.

At S401: indication information of a paging bandwidth corresponding to a UE and indication information of a synchronization or reference signal having an association relationship with the paging bandwidth are carried in RMSI or OSI.

At S402: the RMSI or the OSI is sent to the UE.

Specifically, the association relationship includes a QCL relationship.

It may be understood that after the UE receives the RMS or the OSI, a paging bandwidth can be determined based on the indication information of the paging bandwidth corresponding to the UE, a synchronization or reference signal is acquired according to the indication information of the synchronization or reference signal having the association relationship with the paging bandwidth, and thereafter a paging message can be received according to the technical solutions performed by the UE in the fore-mentioned embodiments, the details are not repeated herein again.

Figure 6:
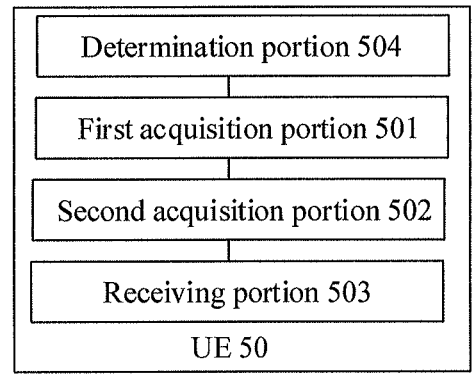
FIG. 6 is a diagram of composition of a UE according to an embodiment of the disclosure.

Based on the same inventive concept as the foregoing embodiments, FIG. 6 illustrates a UE 50 according to an embodiment of the disclosure. The UE 50 includes: a first acquisition portion 501, a second acquisition portion 502 and a receiving portion 503.

The first acquisition portion 501 is configured to acquire association relationships between paging bandwidths and synchronization or reference signals.

The second acquisition portion 502 is configured to acquire, according to the association relationships, a synchronization or reference signal associated with a paging bandwidth corresponding to the UE.

The receiving portion 503 is configured to receive, according to the synchronization or reference signal, a paging message in the paging bandwidth corresponding to the UE.

In the above solutions, the first acquisition portion 501 is specifically configured to receive RMSI or OSI, herein, the RMSI or the OSI is used for notifying indication information of each of the paging bandwidths and indication information of a synchronization or reference signal having an association relationship with the paging bandwidth.

In the above solutions, the first acquisition portion 501 is specifically configured to define each association relationship according to a preset association relationship establishment strategy.

The preset association relationship establishment strategy comprises one of:

a paging message in a paging bandwidth has an association relationship with a synchronization or reference signal on a BWP on which the paging bandwidth is located, herein, the paging bandwidth is a part of the BWP and the BWP is a part of a system bandwidth, or a paging message in a paging bandwidth has an association relationship with a synchronization or reference signal that is closest to the paging bandwidth in a frequency domain, or a paging message in a paging bandwidth has an association relationship with a preset synchronization or reference signal.

In the above solutions, the synchronization or reference signal includes at least one of: an SS block, a CSI-RS, or a TRS.

In the above solutions, the synchronization or reference signal is configured by a network device to the UE. The SS block and the CSI-RS are used for RRM and mobility measurement, and the TRS is used for time frequency tracking.

In the above solutions, the UE 50 further includes a determination portion 504, configured to: determine whether the paging bandwidth corresponding to the UE has an association relationship with a detected synchronization or reference signal, and trigger, responsive to that the paging bandwidth corresponding to the UE has no association relationship with the detected synchronization or reference signal, the first acquisition portion 501.

In the above solutions, the determination portion determines that the paging bandwidth corresponding to the UE has no the association relationship with the detected synchronization or reference signal includes:

a BWP on which the paging bandwidth corresponding to the UE is located is different from a BWP on which the detected synchronization or reference signal is located;

a distance between a frequency domain location of the paging bandwidth corresponding to the UE and a frequency domain location of the detected synchronization or reference signal is greater than a set distance threshold; or a frequency domain location of the paging bandwidth corresponding to the UE and a frequency domain location of the detected synchronization or reference signal belong to different RF chains.

In the above solutions, each association relationship includes a QCL relationship.

It may be understood that in this embodiment, the "portion" may be a circuit, a processor, a program or software, and the like, and certainly may also be a unit, may further be modular and may also be non-modular.

In addition, each compositional portion in the embodiment may be integrated into one processing unit, or each of the units may exist alone physically, or two or more units are integrated into one unit. The integrated unit may be implemented in a form of hardware, and may also be implemented in a form of a software functional module.

When the integrated units are implemented in the form of the software functional unit and sold or used as an independent product, the units may be stored in a computer-readable storage medium. Based on such an understanding, the technical solutions of the disclosure essentially, or the part contributing to the prior art, or some of the technical solutions may be implemented in a form of a software product. The computer software product is stored in a storage medium and includes several instructions to enable a computer device (which may be a personal computer, a server, or a network device) or processor to perform all or some of the operations of the methods described in the embodiments of the disclosure. The foregoing storage medium includes any medium that can store a program code, such as a U disk, a removable hard disk, a Read Only Memory (ROM), a Random Access Memory (RAM), a magnetic disk, or an optical disc.

Therefore, an embodiment of the disclosure provides a computer-readable medium. The computer-readable medium stores a program for receiving information that, when executed by at least one processor, to implement the operations of the method performed by the UE in the fore-mentioned embodiments.

Figure 7:
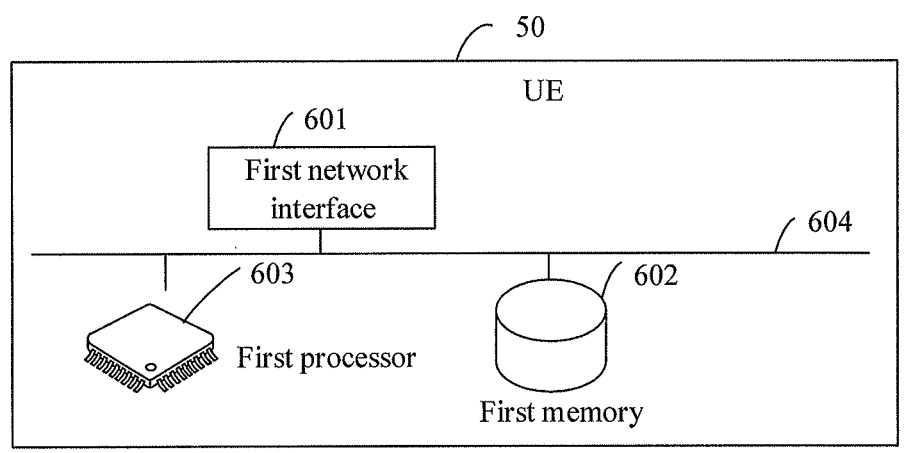
FIG. 7 is a diagram of a specific hardware structure of a UE according to an embodiment of the disclosure.

Based on the above UE 50 and the computer-readable medium, FIG. 7 illustrates a specific hardware structure of the UE 50 according to an embodiment of the disclosure. The specific hardware structure may include: a first network interface 601, a first memory 602 and a first processor 603; and each component is coupled together via a bus system 604. It may be understood that the bus system 604 is configured to implement connection and communication among these components. In addition to a data bus, the bus system 604 may further include a power bus, a control bus and a state signal bus. However, for the clarity, each bus is marked as the bus system 604 in FIG. 7. The first network interface 601 is configured to receive and send signals in a process of receiving and sending information between the UE with other external network elements.

The first memory 602 is configured to store a computer program which is executed on the first processor 603.

The first processor 603 is configured to, when executing the computer program, perform the following operations.

Association relationships between paging bandwidths and synchronization or reference signals are acquired.

A paging message is received in a paging bandwidth corresponding to the UE, according to a synchronization or reference signal having an association relationship with the paging bandwidth corresponding to the UE in the association relationships.

According to at least some embodiment, or the first processor 603 is configured to, when executing the computer program, perform the following operations.

Association relationships between paging bandwidths and synchronization or reference signals are acquired.

A synchronization or reference signal associated with a paging bandwidth corresponding to the UE is acquired according to the association relationships.

A paging message is received in the paging bandwidth corresponding to the UE, according to the synchronization or reference signal.

It may be understood that the first memory 602 in the embodiment may be a volatile memory or a non-volatile memory, or may include the volatile memory and the non-volatile memory. The non-volatile memory may be an ROM, a Programmable ROM (PROM), an Erasable PROM (EPROM), an Electrically EPROM (EEPROM) or a flash memory. The volatile memory may be an RAM and is used as an external high-speed cache. Through exemplary but not restrictive description, RAMs in many forms are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). The first memory 602 of the system and the method described herein is intended to include but not limited to these memories and any other suitable type of memory.

The first processor 603 may be an integrated circuit chip, and has a signal processing capability. During an implementation process, each operation of the method may be completed via an integrated logic circuit of hardware in the first processor 603 or an instruction in a software form. The first processor 603 may be a universal processor, a Digital Signal Processor (DSP), an Application Specific Integrated Circuit (ASIC), a Field Programmable Gate Array (FPGA) or other programmable logic devices, discrete gates or transistor logic devices, discrete hardware components. The processor may implement or execute each method, operation and logic block diagram disclosed in the embodiments of the disclosure. The universal processor may be a microprocessor or the processor may also be any conventional processor and the like. Operations of the methods disclosed in combination with the embodiments of the disclosure may be directly executed and accomplished by means of a hardware decoding processor or may be executed and accomplished using a combination of hardware and software modules in the decoding processor. The software module may be located in a mature storage medium in the art, such as an RAM, a flash memory, an ROM, a PROM, an EEPROM or a register. The storage medium is located in the first memory 602; the first processor 603 reads information in the first memory 602, and completes the operations of the above method in combination with hardware thereof.

It may be understood that these embodiments described herein may be implemented by using hardware, software, firmware, middleware, a microcode or a combination thereof. For the implementation of the hardware, a processing unit may be implemented in one or more Application Specific Integrated Circuits (ASICs), a Digital Signal Processing (DSP), a DSP Device (DSPD), a Programmable Logic Device (PLD), a Field-Programmable Gate Array (FPGA), a universal processor, a controller, a microcontroller, a microprocessor, and other electronic units configured to execute the functions of the disclosure or a combination thereof.

For the implementation of the software, technologies used herein may be implemented via modules (such as a process and a function, etc.) for executing the functions of the disclosure. The software code may be stored in the memory and is executed by the processor. The memory may be implemented in the processor or out of the processor.

Specifically, the first processor 603 in the UE 50 is further configured to perform, when executing the computer program, the operations of the method performed by the UE in the fore-mentioned embodiments, the details are not described herein again.

Figure 8:
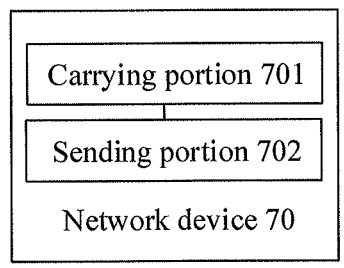
FIG. 8 is a diagram of composition of a network device according to an embodiment of the disclosure.

Based on the same inventive concept as the foregoing embodiments, FIG. 8 illustrates a composition of a network device 70 according to an embodiment of the disclosure. The network device 70 may include: a carrying portion 701 and a sending portion 702.

The carrying portion 701 is configured to carry, in RMSI or OSI, indication information of a paging bandwidth corresponding to a UE and indication information of a synchronization or reference signal having an association relationship with the paging bandwidth.

The sending portion 702 is configured to send the RMSI or the OSI to the UE.

In the above solutions, the association relationship includes a QCL relationship.

In addition, an embodiment of the disclosure provides a computer-readable medium. The computer-readable medium stores a program for receiving information that, when executed by at least one processor, to implement the operations of the method performed by the network device in the fore-mentioned embodiments. Detailed description on the computer-readable medium refers to the description about the computer-readable medium in the fore-mentioned embodiment, and will not be repeated here.

Figure 9:
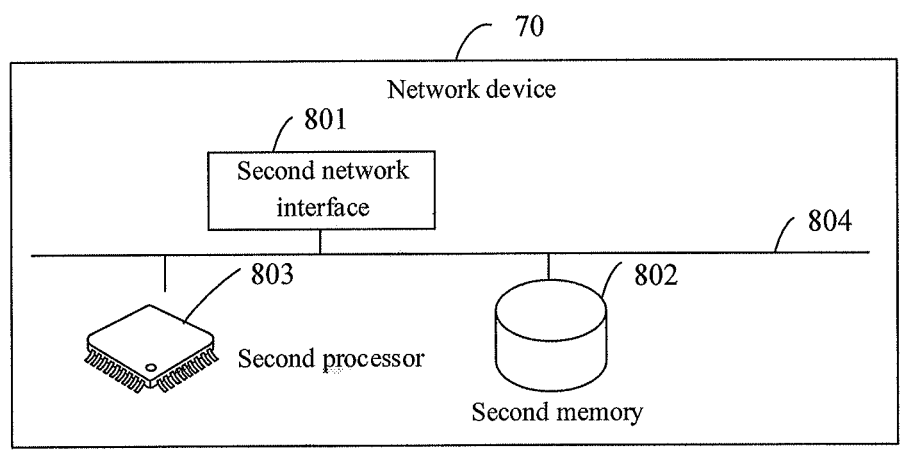
FIG. 9 is a diagram of a specific hardware structure of a network device according to an embodiment of the disclosure.

Based on the network device 70 and the computer-readable medium, FIG. 9 illustrates a specific hardware composition of a network device 70 according to an embodiment of the disclosure. The network device 70 may include: a second network interface 801, a second memory 802 and a second processor 803; and each component is coupled together via a bus system 804. It may be understood that the bus system 804 is configured to implement connection and communication among these components. In addition to a data bus, the bus system 804 may further include a power bus, a control bus and a state signal bus. However, for the clarity, each bus is marked as the bus system 804 in FIG. 9.

The second network interface 801 is configured to receive and send a signal in a process of receiving and sending information between the network device and other external network elements.

The second memory 802 is configured to store a computer program which is executed on the second processor 803.

The second processor 803 is configured to, when executing the computer program, perform the following operations.

Indication information of a paging bandwidth corresponding to a UE and indication information of a synchronization or reference signal having an association relationship with the paging bandwidth are carried in Remaining Minimum System Information (RMSI) or Other System Information (OSI).

The RMSI or the OSI is sent to the UE.

It may be understood that components in the specific hardware structure of the network device 70 in the embodiment are similar to corresponding portions in the hardware structure of the UE 50 in the fore-mentioned embodiment, and will not be repeated here.

Specifically, the second processor 803 in the network device 70 is further configured to perform, when executing the computer program, the operations of the method performed by the network device in the fore-mentioned embodiments, details are not described herein again.

Additional Embodiments

At least some embodiments of the disclosure provide a method for receiving information, the method being applied to User Equipment (UE) and comprising:

acquiring association relationships between paging bandwidths and synchronization or reference signals;

acquiring a synchronization or reference signal associated with a paging bandwidth corresponding to the UE according to the association relationships; and receiving a paging message in the paging bandwidth corresponding to the UE according to the synchronization or reference signal.

According to at least some embodiments, wherein acquiring the association relationships between the paging bandwidths and the synchronization or reference signals comprises:

receiving Remaining Minimum System Information (RMSI) or Other System Information (OSI), wherein the RMSI or the OSI is used for notifying indication information of each of the paging bandwidths and indication information of a synchronization or reference signal having an association relationship with the paging bandwidth.

According to at least some embodiments, wherein acquiring the association relationships between the paging bandwidths and the synchronization or reference signals comprises: defining each association relationship according to a preset association relationship establishment strategy, wherein the preset association relationship establishment strategy comprises one of:

a paging message in a paging bandwidth has an association relationship with a synchronization or reference signal on a BandWidth Part (BWP) on which the paging bandwidth is located, wherein the paging bandwidth is a part of the BWP and the BWP is a part of a system bandwidth;

a paging message in a paging bandwidth has an association relationship with a synchronization or reference signal that is closest to the paging bandwidth in a frequency domain; or a paging message in a paging bandwidth has an association relationship with a preset synchronization or reference signal.

According to at least some embodiments, wherein the synchronization or reference signal comprises at least one of: a Synchronization Signal block (SS block), a Channel State Information Reference Signal (CSI-RS), or a Tracking Reference Signal (TRS).

According to at least some embodiments, wherein the synchronization or reference signal is configured by a network device to the UE; and the SS block and the CSI-RS are used for Radio Resource Management (RRM) and mobility measurement, and the TRS is used for time frequency tracking.

According to at least some embodiments, the method further comprising: responsive to that the paging bandwidth corresponding to the UE has no association relationship with a detected synchronization or reference signal, acquiring a synchronization or reference signal having an association relationship with the paging bandwidth corresponding to the UE.

According to at least some embodiments, wherein the paging bandwidth corresponding to the UE has no association relationship with the detected synchronization or reference signal comprises one of:

a BWP on which the paging bandwidth corresponding to the UE is located is different from a BWP on which the detected synchronization or reference signal is located; or a distance between a frequency domain location of the paging bandwidth corresponding to the UE and a frequency domain location of the detected synchronization or reference signal is greater than a set distance threshold; or a frequency domain location of the paging bandwidth corresponding to the UE and a frequency domain location of the detected synchronization or reference signal belong to different Radio-Frequency (RF) chains.

According to at least some embodiments, wherein each association relationship comprises a Quasi-Co-Location (QCL) relationship.

At least some embodiments of the disclosure provide a UE, comprising: a first acquisition portion, a second acquisition portion and a receiving portion, wherein the first acquisition portion is configured to acquire association relationships between paging bandwidths and synchronization or reference signals;

the second acquisition portion is configured to acquire, according to the association relationships, a synchronization or reference signal associated with a paging bandwidth corresponding to the UE; and the receiving portion is configured to receive, according to the synchronization or reference signal, a paging message in the paging bandwidth corresponding to the UE.

According to at least some embodiments, wherein the first acquisition portion is configured to: receive Remaining Minimum System Information (RMSI) or Other System Information (OSI), wherein the RMSI or the OSI is used for notifying indication information of each of the paging bandwidths and indication information of a synchronization or reference signal having an association relationship with the paging bandwidth.

According to at least some embodiments, wherein the first acquisition portion is configured to: define each association relationship according to a preset association relationship establishment strategy, wherein the preset association relationship establishment strategy comprises one of:

a paging message in a paging bandwidth has an association relationship with a synchronization or reference signal on a BandWidth Part (BWP) on which the paging bandwidth is located, wherein the paging bandwidth is a part of the BWP and the BWP is a part of a system bandwidth;

a paging message in a paging bandwidth has an association relationship with a synchronization or reference signal that is closest to the paging bandwidth in a frequency domain; or a paging message in a paging bandwidth has an association relationship with a preset synchronization or reference signal.

According to at least some embodiments, wherein the synchronization or reference signal comprises at least one of: a Synchronization Signal block (SS block), a Channel State Information Reference Signal (CSI-RS), or a Tracking Reference Signal (TRS).

According to at least some embodiments, wherein the synchronization or reference signal is configured by a network device to the UE; and the SS block and the CSI-RS are used for Radio Resource Management (RRM) and mobility measurement, and the TRS is used for time frequency tracking.

According to at least some embodiments, the UE further comprising a determination portion, configured to: determine whether the paging bandwidth corresponding to the UE has an association relationship with a detected synchronization or reference signal, and trigger, responsive to that the paging bandwidth corresponding to the UE has no association relationship with the detected synchronization or reference signal, the first acquisition portion.

According to at least some embodiments, wherein the determination portion determines that the paging bandwidth corresponding to the UE has no association relationship with the detected synchronization or reference signal comprises one of:

a BWP on which the paging bandwidth corresponding to the UE is located is different from a BWP on which the detected synchronization or reference signal is located; or a distance between a frequency domain location of the paging bandwidth corresponding to the UE and a frequency domain location of the detected synchronization or reference signal is greater than a set distance threshold; or a frequency domain location of the paging bandwidth corresponding to the UE and a frequency domain location of the detected synchronization or reference signal belong to different Radio-Frequency (RF) chains.

According to at least some embodiments, wherein each association relationship comprises a Quasi-Co-Location (QCL) relationship.

At least some embodiments of the disclosure a UE, comprising: a first network interface, a first memory and a first processor, wherein the first network interface is configured to receive and send signals in a process of receiving and sending information between the UE and other external network elements;

the first memory is configured to store a computer program executed on the first processor; and the first processor is configured to perform, when executing the computer program, the operations of the method implemented by the UE in above-mentioned embodiments.

At least some embodiments of the disclosure provide a method for receiving information, the method being applied to a network device and comprising:

carrying, in Remaining Minimum System Information (RMSI) or Other System Information (OSI), indication information of a paging bandwidth corresponding to User Equipment (UE) and indication information of a synchronization or reference signal having an association relationship with the paging bandwidth; and sending the RMSI or the OSI to the UE.

According to at least some embodiments, wherein the association relationship comprises a Quasi-Co-Location (QCL) relationship.

At least some embodiments of the disclosure provide a network device, comprising a carrying portion and a sending portion, wherein the carrying portion is configured to carry, in Remaining Minimum System Information (RMSI) or Other System Information (OSI), indication information of a paging bandwidth corresponding to User Equipment (UE) and indication information of a synchronization or reference signal having an association relationship with the paging bandwidth; and the sending portion is configured to send the RMSI or the OSI to the UE.

According to at least some embodiments, wherein the association relationship comprises a Quasi-Co-Location (QCL) relationship.

At least some embodiments of the disclosure provide a network device, comprising: a second network interface, a second memory and a second processor, wherein the second network interface is configured to receive and send signals in a process of receiving and sending information between the network device and other external network elements;

the second memory is configured to store a computer program executed on the second processor; and the second processor is configured to perform, when executing the computer program, the operations of the method implemented by the network device in above-mentioned embodiments.

At least some embodiments of the disclosure provide a method for receiving information, the method being applied to User Equipment (UE) and comprising:

acquiring association relationships between paging bandwidths and synchronization or reference signals; and receiving a paging message in a paging bandwidth corresponding to the UE, according to a synchronization or reference signal having an association relationship with the paging bandwidth corresponding to the UE in the association relationships.

According to at least some embodiments, wherein acquiring the association relationships between the paging bandwidths and the synchronization or reference signals comprises:

receiving Remaining Minimum System Information (RMSI) or Other System Information (OSI), wherein the RMSI or the OSI is used for notifying indication information of each of the paging bandwidths and indication information of a synchronization or reference signal having an association relationship with the paging bandwidth.

According to at least some embodiments, wherein acquiring the association relationships between the paging bandwidths and the synchronization or reference signals comprises: defining each association relationship according to a preset association relationship establishment strategy, wherein the preset association relationship establishment strategy comprises one of:

a paging message in a paging bandwidth has an association relationship with a synchronization or reference signal on a BandWidth Part (BWP) on which the paging bandwidth is located, wherein the paging bandwidth is a part of the BWP and the BWP is a part of a system bandwidth;

a paging message in a paging bandwidth has an association relationship with a synchronization or reference signal that is closest to the paging bandwidth in a frequency domain; or a paging message in a paging bandwidth has an association relationship with a preset synchronization or reference signal.

According to at least some embodiments, wherein the synchronization or reference signal comprises at least one of: a Synchronization Signal block (SS block), a Channel State Information Reference Signal (CSI-RS), or a Tracking Reference Signal (TRS).

According to at least some embodiments, wherein the synchronization or reference signal is configured by a network device to the UE; and the SS block and the CSI-RS are used for Radio Resource Management (RRM) and mobility measurement, and the TRS is used for time frequency tracking.

According to at least some embodiments, the method further comprising: responsive to that the paging bandwidth corresponding to the UE has no association relationship with a detected synchronization or reference signal, acquiring association relationships between paging bandwidths and synchronization or reference signals, and receiving a paging message in a paging bandwidth corresponding to the UE, according to a synchronization or reference signal having an association relationship with the paging bandwidth corresponding to the UE in the association relationships.

According to at least some embodiments, wherein the detected synchronization or reference signal is a synchronization or reference signal detected by the UE in a system bandwidth.

According to at least some embodiments, wherein the paging bandwidth corresponding to the UE has no association relationship with the detected synchronization or reference signal comprises one of:

a BWP on which the paging bandwidth corresponding to the UE is located is different from a BWP on which the detected synchronization or reference signal is located; or a distance between a frequency domain location of the paging bandwidth corresponding to the UE and a frequency domain location of the detected synchronization or reference signal is greater than a set distance threshold; or a frequency domain location of the paging bandwidth corresponding to the UE and a frequency domain location of the detected synchronization or reference signal belong to different Radio-Frequency (RF) chains.

According to at least some embodiments, wherein each association relationship comprises a Quasi-Co-Location (QCL) relationship.

At least some embodiments of the disclosure provide a UE, comprising: a processor and a network interface, wherein the processor is configured to acquire association relationships between paging bandwidths and synchronization or reference signals;

the processor is further configured to receive, according to a synchronization or reference signal having an association relationship with a paging bandwidth corresponding to the UE in the association relationships, a paging message in the paging bandwidth corresponding to the UE through the network interface.

According to at least some embodiments, wherein the processor is configured to: receive, through the network interface, Remaining Minimum System Information (RMSI) or Other System Information (OSI), wherein the RMSI or the OSI is used for notifying indication information of each of the paging bandwidths and indication information of a synchronization or reference signal having an association relationship with the paging bandwidth.

According to at least some embodiments, wherein the processor is configured to: define each association relationship according to a preset association relationship establishment strategy, wherein the preset association relationship establishment strategy comprises one of:

a paging message in a paging bandwidth has an association relationship with a synchronization or reference signal on a BandWidth Part (BWP) on which the paging bandwidth is located, wherein the paging bandwidth is a part of the BWP and the BWP is a part of a system bandwidth;

a paging message in a paging bandwidth has an association relationship with a synchronization or reference signal that is closest to the paging bandwidth in a frequency domain; or a paging message in a paging bandwidth has an association relationship with a preset synchronization or reference signal.

According to at least some embodiments, wherein the synchronization or reference signal comprises at least one of: a Synchronization Signal block (SS block), a Channel State Information Reference Signal (CSI-RS), or a Tracking Reference Signal (TRS).

According to at least some embodiments, wherein the synchronization or reference signal is configured by a network device to the UE; and the SS block and the CSI-RS are used for Radio Resource Management (RRM) and mobility measurement, and the TRS is used for time frequency tracking.

According to at least some embodiments, wherein the processor is configured to: determine whether the paging bandwidth corresponding to the UE has an association relationship with a detected synchronization or reference signal, and acquire, responsive to that the paging bandwidth corresponding to the UE has no association relationship with the detected synchronization or reference signal, association relationships between paging bandwidths and synchronization or reference signals and receive a paging message in a paging bandwidth corresponding to the UE, according to a synchronization or reference signal having an association relationship with the paging bandwidth corresponding to the UE in the association relationships.

According to at least some embodiments, wherein the detected synchronization or reference signal is a synchronization or reference signal detected by the UE in a system bandwidth.

According to at least some embodiments, wherein the processor determines that the paging bandwidth corresponding to the UE has no association relationship with the detected synchronization or reference signal comprises one of:

a BWP on which the paging bandwidth corresponding to the UE is located is different from a BWP on which the detected synchronization or reference signal is located; or a distance between a frequency domain location of the paging bandwidth corresponding to the UE and a frequency domain location of the detected synchronization or reference signal is greater than a set distance threshold; or a frequency domain location of the paging bandwidth corresponding to the UE and a frequency domain location of the detected synchronization or reference signal belong to different Radio-Frequency (RF) chains.

According to at least some embodiments, wherein each association relationship comprises a Quasi-Co-Location (QCL) relationship.

At least some embodiments of the disclosure provide a network device, comprising a processor and a network interface, wherein the processor is configured to carry, in Remaining Minimum System Information (RMSI) or Other System Information (OSI), indication information of a paging bandwidth corresponding to User Equipment (UE) and indication information of a synchronization or reference signal having an association relationship with the paging bandwidth; and the network interface is configured to send the RMSI or the OSI to the UE.

According to at least some embodiments, wherein the association relationship comprises a Quasi-Co-Location (QCL) relationship.

At least some embodiments of the disclosure a computer-readable medium storing a program for receiving information that, when executed by at least one processor, to implement the operations of the method in any of above-mentioned embodiments.

The embodiments of the disclosure have the following advantages. After the UE determines a paging bandwidth corresponding to the UE, a synchronization or reference signal associated with the paging bandwidth corresponding to the UE can be obtained based on the acquired association relationships between the paging bandwidths and the synchronization or reference signals. Thus, the UE can obtain a synchronization and channel state according to the synchronization or reference signal, and receive a paging message from the paging bandwidth corresponding to the UE. In such a manner, the UE can receive the paging message more accurately, and the success rate of receiving the paging message by the UE in the paging bandwidth corresponding to the UE is improved.

It will be appreciated by one skilled in the art that the embodiments of the disclosure may be embodied as a system, a method, or a computer program product. Accordingly, the disclosure may take the form of a hardware embodiment, a software embodiment or an embodiment combining software and hardware aspects. Furthermore, the disclosure may take the form of a computer program product implemented on one or more computer-readable storage media (including but not limited to a magnetic disk memory and an optical memory) having a computer available program code.

The disclosure is described herein with reference to flowcharts and/or block diagrams of methods, devices (systems) and computer program products according to embodiments of the disclosure. It will be understood that each flow of the flowcharts and/or each block of the block diagrams, and combinations of flows of the flowcharts and/or blocks of block diagrams, can be implemented by computer program instructions. These computer program instructions may be provided to a processor of a general purpose computer, a special purpose computer, an embedded processor or other programmable data processing apparatus to produce a machine, such that the instructions, which are executed by the processor of the computer or other programmable instruction execution device, create means for implementing the functions specified in one or more flows of the flowcharts and/or one or more blocks of the block diagrams.

These computer program instructions may also be stored in a computer readable storage medium that can direct a computer or other programmable data processing device to operate in a particular manner, such that the instructions stored in the computer readable storage medium produce an article of manufacture including an instruction device, and the instruction device implements the functions specified in one or more flows of the flowcharts and/or one or more blocks of the block diagrams.

The computer program instructions may also be loaded onto a computer or other programmable data processing device, so that the computer or other programmable data processing device executes a series of operations to produce processing implemented by the computer and the instruction executed on the computer or other programmable data processing device provides operations for implementing the functions specified in one or more flows of the flowcharts and/or one or more blocks of the block diagrams.

The above are only preferred embodiments of the disclosure, and are not intended to limit a scope of protection of the disclosure.

INDUSTRIAL APPLICABILITY

In the embodiments of the disclosure, the UE acquires, after the UE determines a paging bandwidth corresponding to the UE, a synchronization or reference signal associated with the paging bandwidth corresponding to the UE based on acquired association relationships between paging bandwidths and synchronization or reference signals, thus the UE can obtain a synchronization and channel state according to the synchronization or reference signal, and receive a paging message from the paging bandwidth corresponding to the UE. In such a manner, the UE can receive the paging message more accurately, and the success rate of receiving the paging message by the UE from the paging bandwidth corresponding to the UE is improved.

The invention claimed is:

1. A method for receiving information, the method being applied to User Equipment (UE) and comprising:

receiving Remaining Minimum System Information (RMSI) or Other System Information (OSI), wherein the RMSI or the OSI is used for notifying indication information of each of paging bandwidths and indication information of a synchronization or reference signal having an association relationship with the paging bandwidth, and the association relationship comprises a Quasi-Co-Location (QCL) relationship; and receiving a paging message in a paging bandwidth corresponding to the UE, according to a synchronization or reference signal having an association relationship with the paging bandwidth corresponding to the UE.

2. The method of claim 1, wherein the synchronization or reference signal comprises at least one of: a Synchronization Signal block (SS block), a Channel State Information Reference Signal (CSI-RS), or a Tracking Reference Signal (TRS).

3. The method of claim 2, wherein the synchronization or reference signal is configured by a network device to the UE; and the SS block and the CSI-RS are used for Radio Resource Management (RRM) and mobility measurement, and the TRS is used for time frequency tracking.

4. The method of claim 1, further comprising:
responsive to that the paging bandwidth corresponding to the UE has no association relationship with a detected synchronization or reference signal,
receiving the RMSI or the OSI, and receiving the paging message in the paging bandwidth corresponding to the UE according to the synchronization or reference signal having the association relationship with the paging bandwidth corresponding to the UE.

5. The method of claim 4, wherein the detected synchronization or reference signal is a synchronization or reference signal detected by the UE in a system bandwidth.

6. The method of claim 4, wherein the paging bandwidth corresponding to the UE has no association relationship with the detected synchronization or reference signal comprises one of:
a BWP on which the paging bandwidth corresponding to the UE is located is different from a BWP on which the detected synchronization or reference signal is located; or
a distance between a frequency domain location of the paging bandwidth corresponding to the UE and a frequency domain location of the detected synchronization or reference signal is greater than a set distance threshold; or
a frequency domain location of the paging bandwidth corresponding to the UE and a frequency domain location of the detected synchronization or reference signal belong to different Radio-Frequency (RF) chains.

7. User Equipment (UE), comprising: a processor and a network interface, wherein
the processor is configured to receive, through the network interface, Remaining Minimum System Information (RMSI) or Other System Information (OSI), wherein the RMSI or the OSI is used for notifying indication information of each of paging bandwidths and indication information of a synchronization or reference signal having an association relationship with the paging bandwidth, and the association relationship comprises a Quasi-Co-Location (QCL) relationship;
the processor is further configured to receive, according to a synchronization or reference signal having an association relationship with a paging bandwidth corresponding to the UE, a paging message in the paging bandwidth corresponding to the UE through the network interface.

8. The UE of claim 7, wherein the synchronization or reference signal comprises at least one of: a Synchronization Signal block (SS block), a Channel State Information Reference Signal (CSI-RS), or a Tracking Reference Signal (TRS).

9. The UE of claim 8, wherein the synchronization or reference signal is configured by a network device to the UE; and the SS block and the CSI-RS are used for Radio Resource Management (RRM) and mobility measurement, and the TRS is used for time frequency tracking.

10. The UE of claim 7, wherein the processor is configured to: determine whether the paging bandwidth corresponding to the UE has an association relationship with a detected synchronization or reference signal, and receive, responsive to that the paging bandwidth corresponding to the UE has no association relationship with the detected synchronization or reference signal, the RMSI or the OSI through the network interface and receive, according to the synchronization or reference signal having the association relationship with the paging bandwidth corresponding to the UE, the paging message in the paging bandwidth corresponding to the UE through the network interface.

11. The UE of claim 10, wherein the detected synchronization or reference signal is a synchronization or reference signal detected by the UE in a system bandwidth.

12. The UE of claim 10, wherein the processor determines that the paging bandwidth corresponding to the UE has no association relationship with the detected synchronization or reference signal comprises one of:
a BWP on which the paging bandwidth corresponding to the UE is located is different from a BWP on which the detected synchronization or reference signal is located; or
a distance between a frequency domain location of the paging bandwidth corresponding to the UE and a frequency domain location of the detected synchronization or reference signal is greater than a set distance threshold; or
a frequency domain location of the paging bandwidth corresponding to the UE and a frequency domain location of the detected synchronization or reference signal belong to different Radio-Frequency (RF) chains.

13. A network device, comprising a processor and a network interface, wherein
the processor is configured to carry, in Remaining Minimum System Information (RMSI) or Other System Information (OSI), indication information of a paging bandwidth corresponding to User Equipment (UE) and indication information of a synchronization or reference signal having an association relationship with the paging bandwidth, wherein the association relationship comprises a Quasi-Co-Location (QCL) relationship; and
the network interface is configured to send the RMSI or the OSI to the UE.

* * * * *